United States Patent
Branecky

(10) Patent No.: US 11,079,139 B2
(45) Date of Patent: Aug. 3, 2021

(54) WATER HEATER BLOWER LEAKAGE DETECTION

(71) Applicant: A.O. SMITH CORPORATION, Milwaukee, WI (US)

(72) Inventor: Brian Thomas Branecky, Oconomowoc, WI (US)

(73) Assignee: A. O. SMITH CORPORATION, Milwaukee, WI (US)

( * ) Notice: Subject to any disclaimer, the term of this patent is extended or adjusted under 35 U.S.C. 154(b) by 269 days.

(21) Appl. No.: 16/141,585

(22) Filed: Sep. 25, 2018

(65) Prior Publication Data

US 2020/0096232 A1      Mar. 26, 2020

(51) Int. Cl.
| | |
|---|---|
| *F24H 9/20* | (2006.01) |
| *G01M 3/32* | (2006.01) |
| *F24F 11/32* | (2018.01) |
| *F24H 8/00* | (2006.01) |
| *F24H 1/28* | (2006.01) |

(52) U.S. Cl.
CPC .......... *F24H 9/2035* (2013.01); *F24F 11/32* (2018.01); *G01M 3/3272* (2013.01); *F24H 1/285* (2013.01); *F24H 8/006* (2013.01)

(58) Field of Classification Search
CPC ........ F24H 1/285; F24H 8/006; F24H 9/2035; G01M 3/3272; F24F 11/32
See application file for complete search history.

(56) References Cited

U.S. PATENT DOCUMENTS

| | | | | |
|---|---|---|---|---|
| 2009/0151369 A1* | 6/2009 | Lifson | ..................... | G06F 11/30 62/115 |
| 2009/0293867 A1* | 12/2009 | Chian | ................... | F04D 27/001 126/99 R |
| 2012/0323377 A1* | 12/2012 | Hoglund | .................. | F24F 11/30 700/277 |
| 2013/0233170 A1 | 9/2013 | Spiegelman et al. | | |
| 2013/0284117 A1 | 10/2013 | Deivasigamani et al. | | |

(Continued)

FOREIGN PATENT DOCUMENTS

EP        2444747 B1      4/2016

OTHER PUBLICATIONS

Bradford White, "eF Series Ultra High Efficiency Commercial Gas Water Heaters Brochure," publication date unknown (6 pages).

(Continued)

*Primary Examiner* — Roy Y Yi
*Assistant Examiner* — Geoffrey T Evans
(74) *Attorney, Agent, or Firm* — Michael Best & Friedrich LLP

(57) ABSTRACT

Methods and systems for determining a possible leak within a gas water heater. One system is a gas water heater including a blower and an electronic processor. The electronic processor is configured to activate the blower for a predetermined amount of time, receive, during the predetermined amount of time, a measurement of a characteristic of the blower, perform a comparison between the measurement and a predetermined characteristic threshold, and determine, based on the comparison, that a blockage is present within the water heater. The electronic processor is further configured to output a notification in response to determining the blockage is present.

20 Claims, 6 Drawing Sheets

(56) References Cited

U.S. PATENT DOCUMENTS

2016/0076768 A1* 3/2016 Kusachi ................. F23N 1/042
  431/12
2017/0131174 A1 5/2017 Enev et al.
2017/0336091 A1 11/2017 Arensmeier et al.

OTHER PUBLICATIONS

International Search Report and Written Opinion for Application No. PCT/US2019/052892 dated Dec. 11, 2019 (14 pages).

* cited by examiner

WATER HEATER BLOWER LEAKAGE DETECTION

FIELD OF APPLICATION

Embodiments relate to hot water heaters.

SUMMARY

Gas-fired water heaters include heat exchangers that transfer the heat from the products of combustion to the water surrounding the heat exchanger. Components within the tank, although typically coated for protection, are susceptible over time to corrosion, for example, due to high average temperatures. In particular, the temperature near the surface of the heat exchanger, which may be significantly higher than the temperature of other portions of the water tank, makes the surface of the heat exchanger particularly vulnerable to corrosion. Such corrosion may result in one or more leaks within the heat exchanger. Due to the position of the heat exchanger, as well as several components coupled to it, it is not possible to directly determine when and where a leak occurs.

One embodiment provides a gas water heater including a blower and an electronic processor. The electronic processor is configured to activate the blower for a predetermined amount of time, receive, during the predetermined amount of time, a measurement of a characteristic of the blower, perform a comparison between the measurement and a predetermined characteristic threshold, and output a notification when it is determined, based on the comparison, that there is a leak.

Another embodiment provides a method of determining a leak within a water heater based on a characteristic of a blower of the water heater. The method includes activating the blower for a predetermined amount of time, receiving, during the predetermined amount of time, a measurement of a characteristic of the blower, performing a comparison between the measurement and a predetermined characteristic threshold, and outputting a notification when it is determined, based on the comparison, that there is a leak.

Other aspects of the application will become apparent by consideration of the detailed description and accompanying drawings.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
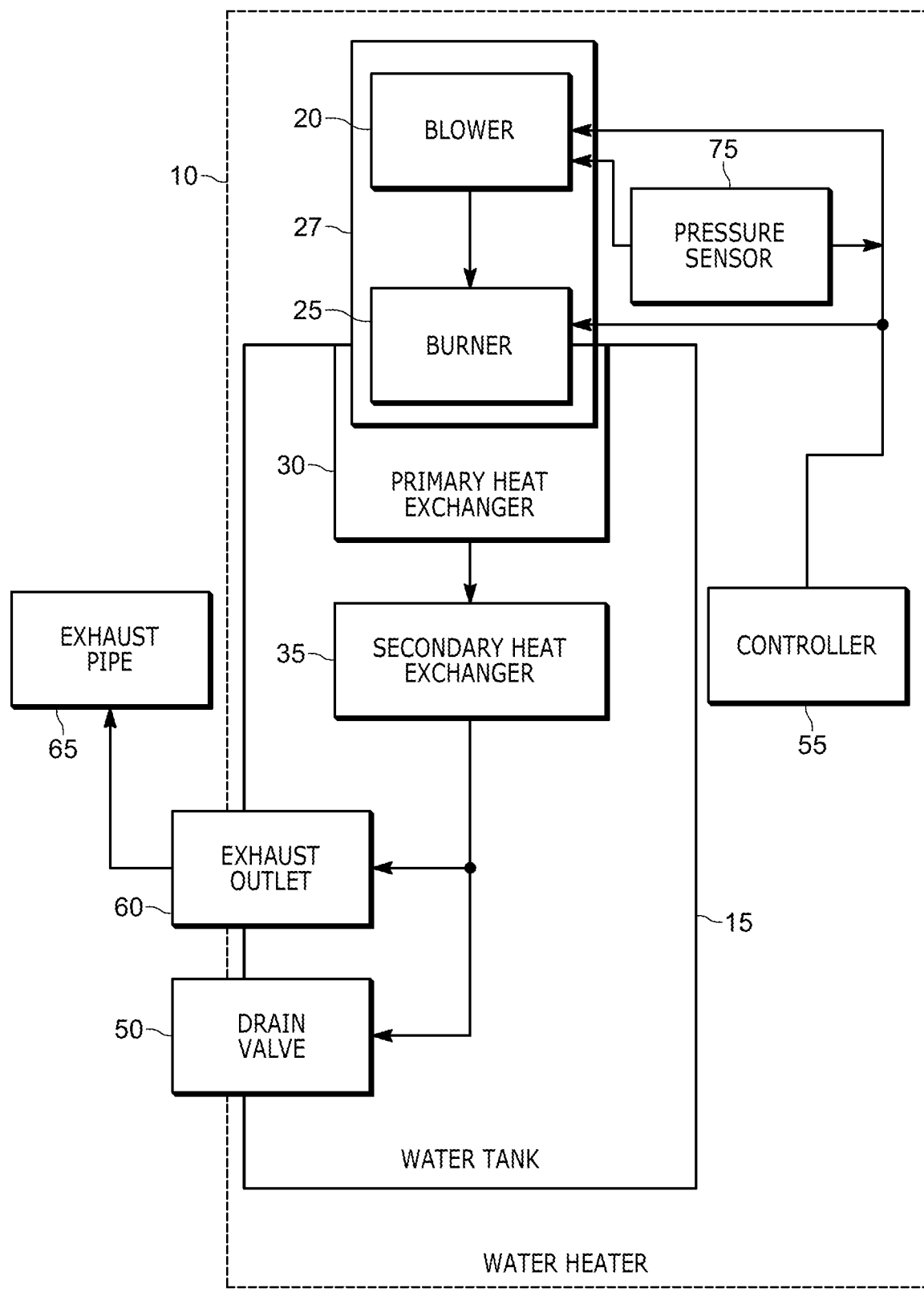
FIG. 1 is a block diagram of a water heater according to some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Before any embodiments of the application are explained in detail, it is to be understood that the application is not limited in its application to the details of construction and the arrangement of components set forth in the following description or illustrated in the following drawing. The application is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

FIG. 1 is a block diagram of a storage-type water heater 10 according to some embodiments of the application. The water heater 10 includes an enclosed water tank 15, a blower 20, a burner 25, a primary heat exchanger 30, a secondary heat exchanger 35, a drain valve 50, a controller 55, an exhaust pipe 65, and an exhaust outlet 60. The blower 20 and burner 25 are collectively referred to herein as a burner assembly 27. The tank 15 is filled with water. Some components and functions of the water heater 10, both illustrated and not shown, are commonly used and understood in the art. Accordingly, for sake of brevity, only the components of the water heater 10 that are essential for the present application are described more fully herein.

In the illustrated embodiment, the burner assembly 27, including the burner 25 and the blower 20, is mounted to the top of tank 15 and pumps air into the primary heat exchanger 30. In some embodiments, the burner 25 extends through the top of the tank 15 and into the primary heat exchanger 30. The burner assembly 27 is configured to receive combustion gas from a gas line (not shown) and air from an air supply line (not shown). The air and gas are combined within the assembly 27 and are subsequently combusted by the burner 25 and driven into the primary heat exchanger 30 via the blower 25. The blower 20 is configured provide air for combustion and air pressure to drive the combustion gases from the water heater 10.

The primary heat exchanger 30 performs as the first portion of a heat exchanger and the secondary heat exchanger 35 (described in more detail in regard to FIG. 2) is the second portion of the heat exchanger. The primary heat exchanger 30 is configured to receive hot gases from the burner 25. The hot gases flow through the primary heat exchanger 30 to the secondary heat exchanger 35. A portion of this heat may be conducted through the wall of the primary heat exchanger 30 and into the water within the water tank 15. In the secondary heat exchanger 35, a percentage of the remainder of the heat of the gases is exchanged into water as the gases flow through the secondary heat exchanger 35. In particular, heat from the hot gases is transferred through the wall of the secondary heat exchanger 35 to the water within the tank 15.

Figure 2:
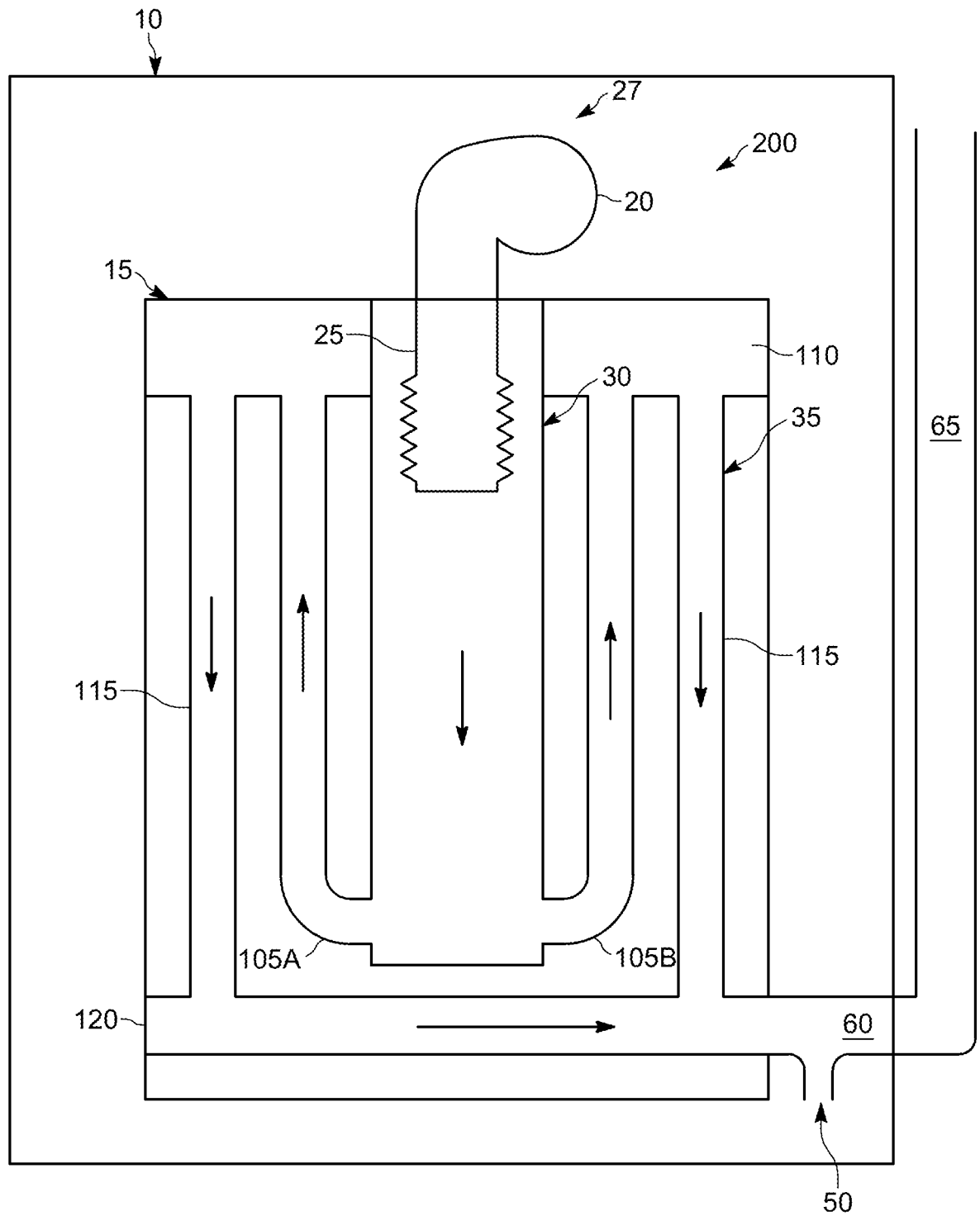
FIG. 2 is a heat exchanger system of the water heater of FIG. 1 according to some embodiments.

FIG. 2 illustrates a heat exchanger system 200 of the water heater 10 in accordance with some embodiments. The system 100 includes the primary heat exchanger 30, the secondary heat exchanger 35, J-tubes 105A and 105B, an upper plenum 110, a plurality of tubes 115, and a lower plenum 120. In the illustrated embodiment, the burner 25 is positioned at the top of the tank 15 such that the burner 25 extends into the primary heat exchanger 30. In the illustrated embodiment, the gases flow through the primary heat exchanger 30 through J-tubes 105A and 105B, to the upper plenum 110. For ease of description, when describing at least one J-tube, a reference to J-tube 105A is made. J-tube 105B may be configured similar to the J-tube 105A. From the upper plenum 110, the gases flow down through the each of the tubes 115 into the lower plenum 120. Heat from the gases is again transferred to the water through the wall of the tubes 115. The gas then exit the system 200 (and water heater 10) through exhaust outlet 60 and through exhaust pipe 65, and is exhausted into the atmosphere.

As the hot gases cool, moisture in the gases condenses and may need to be removed from the heat exchanger system 200 to reduce the possibility of corrosion within. Under certain circumstances, the temperature of the gases may be too high for condensation in the primary heat exchanger 30, but may occur within the secondary heat exchanger 35. Accordingly, at the end of the lower plenum 120 is a drain valve 50 configured to direct/remove condensates to an external drain (not shown).

It should be understood that while a particular number of each component of the secondary heat exchanger 35 are illustrated, in further embodiments the number of a particular component may be different. For example, in some embodiments the secondary heat exchanger 35 includes a single J-tube. In some embodiments, the plurality of tubes 115 is, alternatively, a different configuration of a heat exchanger, (for example, a coil surrounding the primary heat exchanger 30).

Returning to FIG. 1, the water heater 10 includes one or more pressure switches 75. The pressure switches 75 are communicatively coupled to the controller 55. The pressure switches 75 are each configured to open or close (depending on whether the pressure switch is a positive pressure switch or a negative pressure switch) in response to a sensed pressure exceeding a particular threshold. The pressure switches 75 may be configured to open or close in response to an abnormal pressure in the area in which it is monitoring. For example, a pressure switch 75 may be configured to monitor a pressure proximate to the blower 20. A pressure switch 75 may be a normally open switch configured to close in response to the sensed pressure increasing when the blower 20 is activated. When the controller 55 determines that the pressure switch is closed and the blower 20 is off, the controller 55 may provide a visual and/or audible alert (described below in regard to FIG. 3) to a user of the water heater 10 that there is a fault.

In some embodiments, one or more of the pressure switches 75 is configured to measure a pressure in a particular area of the water heater 10 and transmit the measured pressure to the controller 55. Alternatively, one or more of the pressure switches 75 may include a pressure sensor (not shown) configured to perform such functions. In the illustrated embodiment one or more of the pressure switches 75 is additionally configured to measure pressure proximate to the blower 20. In some embodiments, the water heater 10 may include one or more additional sensors configured to measure one or more characteristics (for example, temperature, pressure, voltage, etc.) of the water heater 10.

Figure 3:
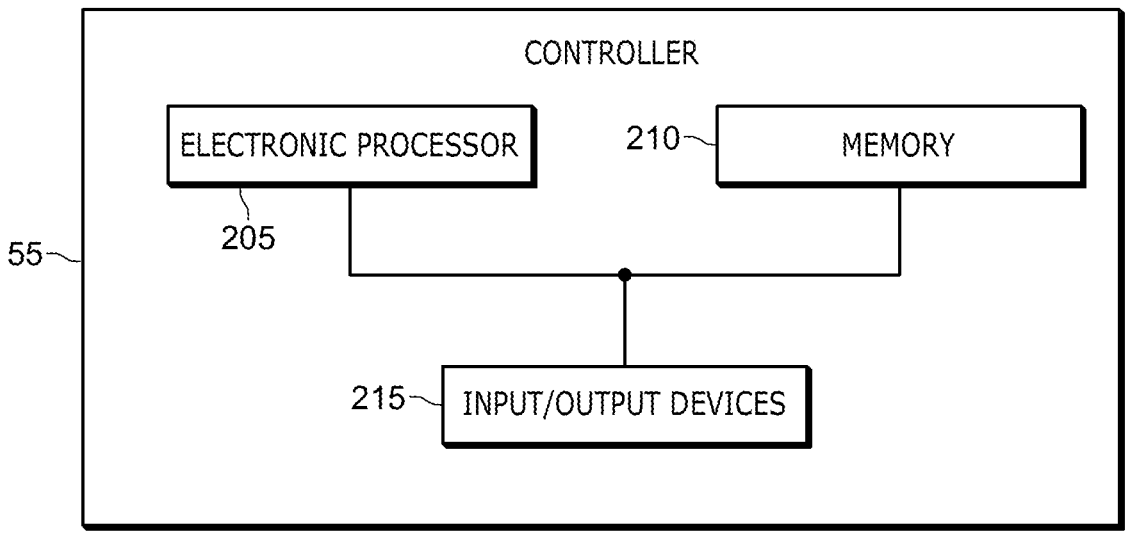
FIG. 3 is a schematic diagram of a controller of the water heater of FIG. 1 according to some embodiments.

FIG. 3 illustrates a schematic diagram of the controller 55. In the illustrated embodiment, the controller 55 is electrically and/or communicatively coupled one or more components of the water heater 10 (for example, the blower 20, the burner 25, the pressure switches 90). In some embodiments, the controller 55, or at least part of the controller 55 may be located remotely from the water heater 10. The controller 55 includes combinations of hardware and software that are operable to, among other things, control the operation of the water heater 10. As shown in FIG. 3, the controller 55 includes an electronic processor 205, a memory 210, and input/output devices 215.

The controller 55 is communicatively coupled to the each of the pressure switches 75 of the water heater 10. The controller 55 may be coupled to other additional sensors not shown in the illustrated embodiments described above. The controller 55 is also communicatively coupled to the burner assembly 27. The controller 55 receives the signals from the switches 75 and controls one or more operations of the water heater 10 (for example, the burner assembly 27) based on the received signals.

For example, as explained above, at least one of the switches 75 may be configured to sense a pressure across the blower 20. When a certain pressure across the blower 20 is sensed by the particular switch, an electrical signal is sent to the controller 55 from the particular switch, signifying the movement of air. Upon receipt of this signal, the controller 55 initiates the ignition of burner 25. A switch of the switches 75 may be configured to measure a back pressure in burner 25 and/or the blower 20. If the burner 25 becomes blocked, the particular switch may be configured to open and the controller 55 will deactivate the water heater 10.

The electronic processor 205 is communicatively coupled to the memory 210, and to the input/output devices 215. The electronic processor 205 receives information regarding the operation of the water heater 10 through the input/output devices 215 connected. In some embodiments, the electronic processor 205 receives command signals via a transceiver (not shown) from a network and determines control signals based on the command signals received. The electronic processor 205 then outputs the control signals to the input/output devices 215.

The memory 210 stores algorithms and/or programs used to control the components of the water heater 10. The memory 210 may also store historical data, usage patterns, and the like to help control the water heater. The memory 210 may also store various thresholds including those described in the methods 400, 500, and 600 described below.

The input/output interface 215 receives and outputs information to and from one or more components of the water heater 10 (for example, the pressure switches 90). The input/output interface 215 may also be configured to output information to the user regarding the operation of the water heater 10. The input/output interface 215 may also receive inputs from the user, for example, via a user interface for the water heater 10. The input/output interface 215 may include a combination of digital and analog input or output devices. For example, the input/output interface 215 may include a touch screen, a speaker, buttons, and the like to receive user input regarding the operation of the water heater 10 (for example, a temperature set point at which water is to be delivered from the water tank 15). The electronic processor 205 also outputs information (for example, alerts regarding an abnormality or a fault within the water heater 10) to the user in the form of, for example, graphics, alarm sounds, and/or other known output devices. The input/output interface 215 may be used to control and/or monitor the water heater 10. For example, the input/output interface 215 may be operably coupled to the controller 55 to control temperature settings of the water heater 10. For example, using the input/output devices 215, a user may set one or more temperature set points for the water heater 10.

The input/output interface 215 may also be configured to display conditions or data associated with the water heater 10 in real-time or substantially real-time. For example, but not limited to, the input/output interface 215 may be configured to display measured characteristics of the water heater 10 based on the data from the one or more sensors (for example, the pressure switches 75). The input/output interface 215 may also include a "power on" indicator and an indicator for the burner 25 and/or the blower 20 to indicate whether the element is active. The input/output interface 215 may be mounted on the shell of the water heater 10, remotely from the water heater 10 in the same room (e.g., on a wall), in another room in the building, or even outside of the building. In some embodiments, the input/output interface 215 may also generate alarms regarding the operation of the water heater 10.

In some embodiments of operation, before the water heater 10 starts a heating cycle, the blower 20 may perform a "purge cycle", where the blower 20 blows air through the primary heat exchanger 30, the secondary heat exchanger 35, and into the lower plenum 120 in order to clear out any blockage such as condensate buildup. Such condensate may exit through the drain valve 50. In some embodiments, the purge cycle is performed after a predetermined time (referred to herein as a wait time) following a heating cycle of the water heater 10. Following the wait time, the purge cycle is performed for a predetermined amount of time (referred to herein as a purge time). Following a purge cycle, the wait cycle may be performed before performing another purge cycle. In some embodiments, as explained in further detail below, the blower 20 repeats the waiting cycle and purge cycle a predefined number of times before the next heating cycle of the water heater 10. Either or both the wait time and purge time may be adjusted following each wait cycle and purge cycle, as explained in more detail below.

In the case of a leak in the system, depending on the nature of leak, water/condensate may leak into the bottom of either or both the J-tubes 105A and 105B creating a blockage within the particular J-tube. As mentioned above, in such cases, the leak may be indirectly determined based on a characteristic of the blower 20.

Figure 4:
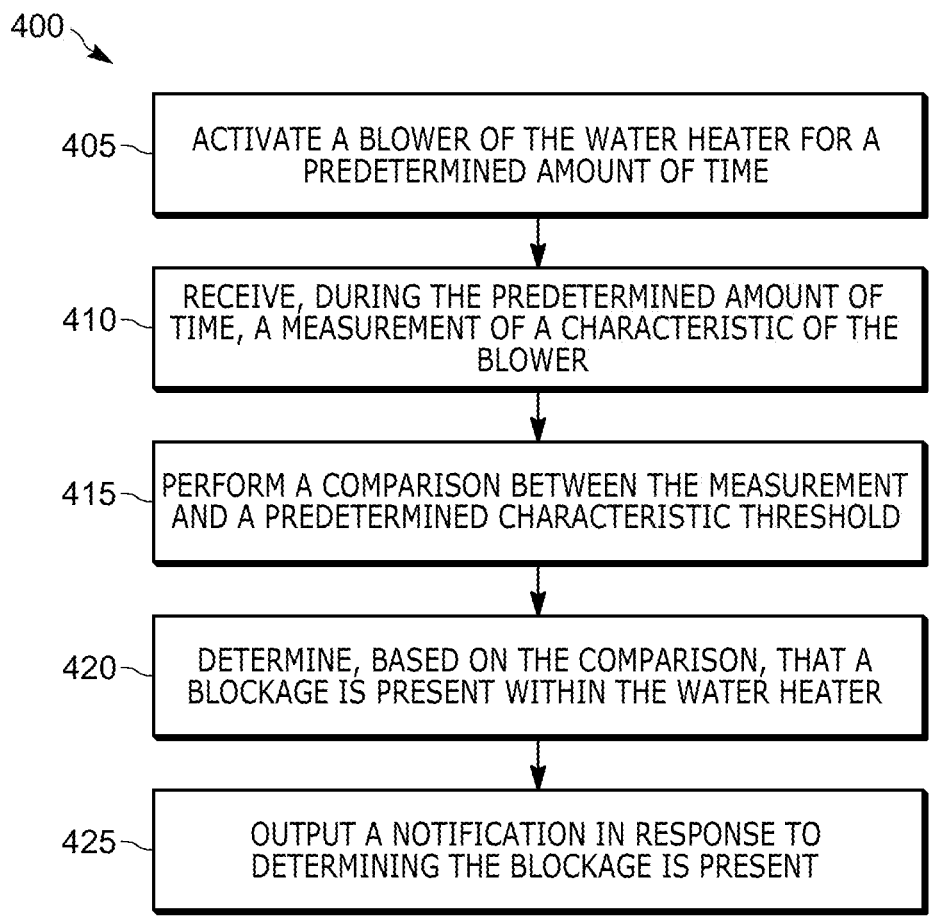
FIG. 4 is a flowchart illustrating a method of determining a blockage within the water heater of FIG. 1 performed by the controller of FIG. 3 according to some embodiments.

FIG. 4 is a flowchart illustrating a process, or method 400 of determining a blockage in the water heater 10 using a characteristic of the blower 20 according to some embodiments. In some embodiments, and as mentioned above, the blockage is indicative/caused by a leak within the water heater 10. While a particular order of processing steps, message receptions, and/or message transmissions is indicated in FIG. 4 (as well as FIG. 5 and FIG. 6) as an example, timing and ordering of such steps, receptions, and transmissions may vary where appropriate without negating the purpose and advantages of the examples set forth in detail throughout the remainder of this disclosure. As an example, the method 400 is described as being performed by the controller 55, in particular, in terms of the electronic processor 205. However, it should be understood that in some embodiments, portions of the method 400 are performed external to the controller 55 by other devices. It should also be understood that while the method 400 is described in regard to determining a blockage caused by a leak within the water heater 10, it should be understood that the method 400 is not limited to blockages caused by leaks (referred to herein as condensate) within the water heater and that the kind of blockage may be any kind (and amount) of material causing a restriction of flow within the system 200.

At block 405, the electronic processor 205 activates the blower 20 for a predetermined amount of time. The predetermined amount of time may be a purge cycle. At block 410, the electronic processor 205 receives, during the predetermined amount of time, a measurement of a characteristic of the blower 20 and, at block 415, performs a comparison between the measurement and a predetermined characteristic threshold. As explained below in regard to methods 500 and 600, the characteristic of the blower 20 may be, for example, an air pressure proximate to the blower or a minimum electrical characteristic measurement of the blower. At block 420, the electronic processor 205 determines, based on the comparison, that a blockage is present within the water heater. As explained in more detail below, the amount of blockage (for example, the amount of condensate resting within the J-tube 105A and/or 105B) may vary. At block 425, the electronic processor 205 outputs a notification, via the input/output interface 215, when it is determined, based on the comparison, that there is a blockage within the water heater 10.

In some embodiments, the method 400 further includes, in response determining a blockage within the water heater 10, activating the blower for a second predetermined time at a greater speed than during the initial predetermined speed (block 405). This second activation of the blower 20 may be performed in order to clear out any residual condensate in the J-tube 35. The speed may be a predefined speed or a calculated speed based on the measurement of the characteristic of the blower 20 (block 415). As explained in more detail below, the controller 55 may use the measurement of a characteristic of the blower to estimate an amount of blockage (for example, condensate) in the J-tube 105 (for example, based on the comparison with the predetermined characteristic threshold). The speed of the blower 20 during the second predetermined time the blower 20 is activated may be based on the estimated amount of blockage.

Figure 5:
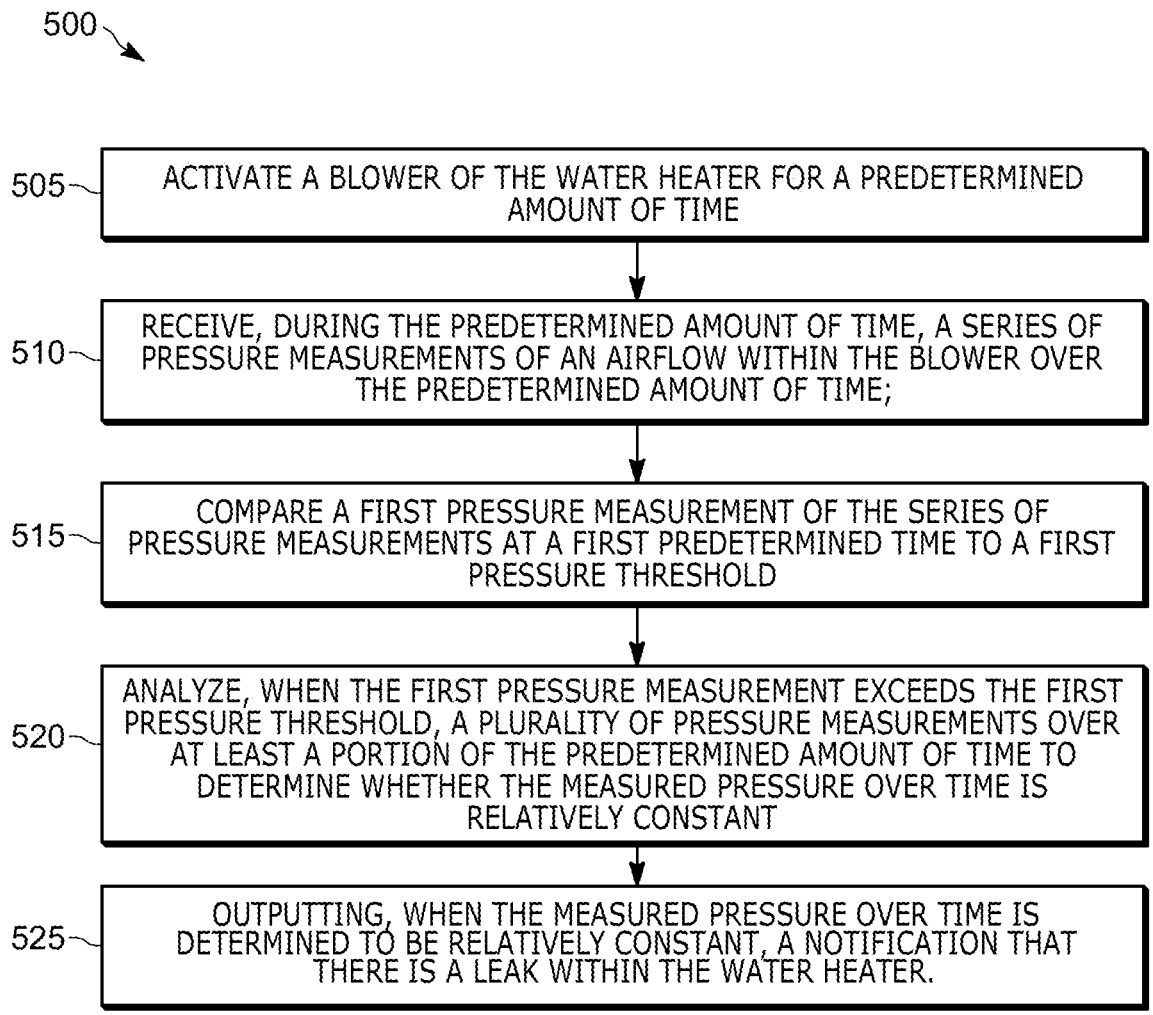
FIG. 5 is a flowchart illustrating a particular example of the method of FIG. 4 according to some embodiments.
Figure 6:
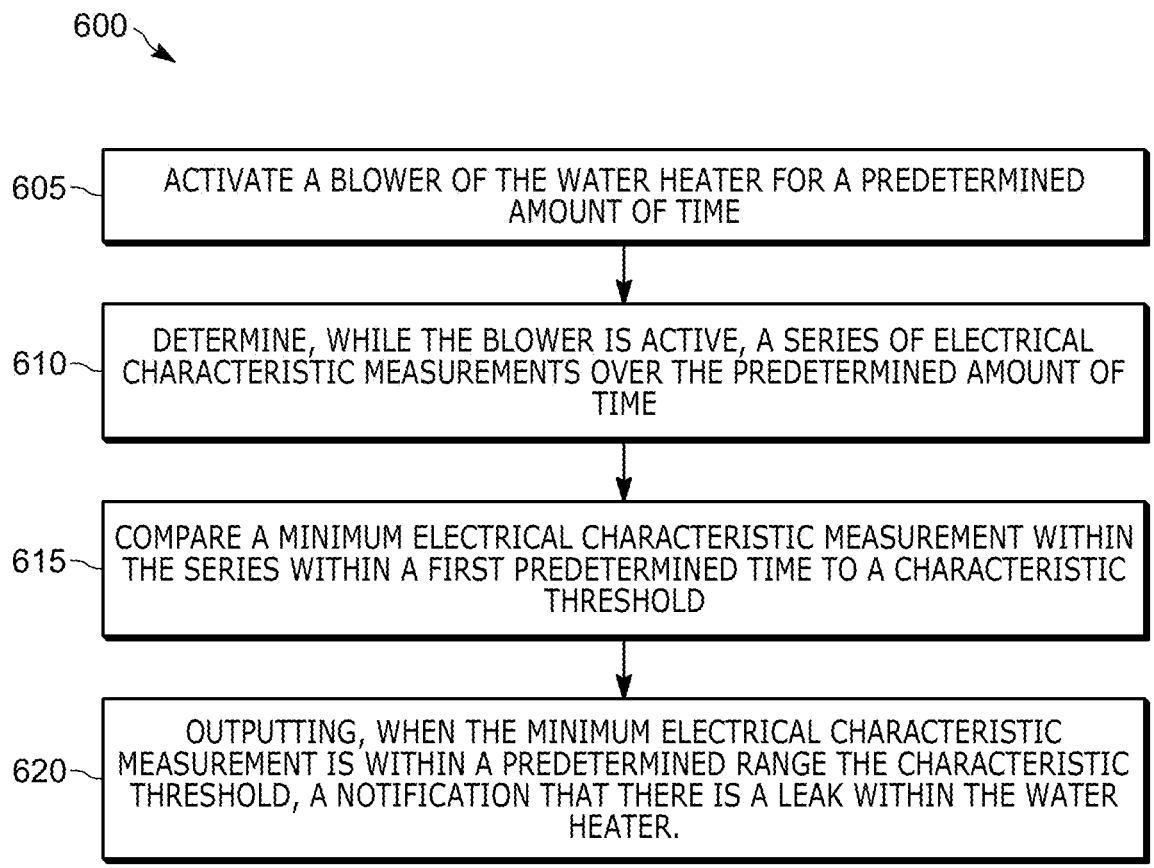
FIG. 6 is a flowchart illustrating a particular example of the method of FIG. 4 according to some embodiments.

As mentioned above, the characteristic of the blower 20 is used to determine a leak within the water heater 10. FIG. 5 is a flowchart illustrating a process, or method 500 of determining a leak in the water heater 10 using a pressure characteristic of the blower 20 according to an embodiment of the application. FIG. 6 is a flowchart illustrating a process, or method 600 of determining a leak in the water heater 10 using an electrical characteristic of the blower 20 according to another embodiment of the application. The methods 500 and 600 are more particular examples of the method 400.

As mentioned above, the blower 20, while on, pushes any condensate resting within the J-tube 105A and/or 105B out of the particular J-tube through the rest of the secondary heat exchanger 35 and out the drain valve 50. In this case, for the predetermined amount of time (staring from the start of the blower 20) the sensed pressure will be at a high level (for example, at approximately or greater than six inches of water (inch wc)) but then may drop over time as more condensate is pushed out of the J-tube. However, when there is a significant amount of condensate (such that there is water build-up on both sides of a single J-tube), the blower 20 may be unable to force the water out and, thus, the measured pressure over the predetermined time will be approximately constant. Accordingly, the method 500 utilizes the pressure measured at the blower 20 to indirectly determine whether there is possibly a leak within the water heater 10.

Again, while a particular order of processing steps, message receptions, and/or message transmissions is indicated in FIG. 5 as an example, timing and ordering of such steps, receptions, and transmissions may vary where appropriate without negating the purpose and advantages of the examples set forth in detail throughout the remainder of this disclosure. As an example, the method 500 is described as being performed by the controller 55, in particular, in terms of the electronic processor 205. However, it should be understood that in some embodiments, portions of the method 500 are performed external to the controller 55 by other devices.

As shown in FIG. 5, at block 505, the controller 55 activates the blower 20 for a predetermined amount of time (for example, during the purge cycle) and, while the blower 20 is active, the controller 55 receives a series of blower 20 pressure measurements (pressure measurements of an airflow within the blower 20) from a pressure sensor (for example, a pressure switch of the pressure switches 90A) over the predetermined amount of time (block 510). At block 515, the controller 55 compares a first pressure measurement of the series of pressure measurements at a first predetermined time (for example, within the 2 to 3 seconds after activating the blower 20) to a first pressure threshold. At block 520, when the pressure measurement exceeds the first pressure threshold, the controller 55 analyzes a plurality of pressure measurements over at least a portion of the predetermined amount of time to determine whether the measured pressure over time is relatively constant (for example, the standard deviation of the plurality of pressure measurements over time is below a predetermined threshold). When the measured pressure over time is determined to be (relatively) constant, the controller 55 outputs a notification, via the input/output interface 215, that there is a possible leak within the water heater 10 (block 525).

In some embodiments, the controller 55 is configured to estimate an amount of condensate trapped in the J-tube 105 based on the pressure measurement of the blower 20. For example, FIG. 6 is a chart 600 illustrating the pressure over time of various amounts of condensate in a single J-tube (for example, J-tube 105A) of the water heater 10 during a purge cycle according to some embodiments. Each of the lines 602A-602H represents an amount of condensate (from no condensate, starting with 2 inches of condensate, then up to 8 inches of condensate respectively) within the J-tube (in inches above the J-tube). At $T_1=t1$, the blower 20 is initiated at a first predetermined speed (in the illustrated case, 7500 RPM) for a predetermined time $T_F=t2$. As shown in the trend of each line 602A-602H, the pressure may initially peak around a particular amount $P_{maxA}$-$P_{maxH}$ for each of the particular amounts of condensate before falling to an approximately constant value. The particular maximum pressure reading for each amount of condensation may accordingly be used to determine an approximate amount of condensate in the J-tube. The controller 55 may then accordingly adjust the purge time, wait time, and/or speed of the blower 20 based on the estimated amount of condensate.

In some embodiments, the controller 55 may indirectly determine whether there is possibly a leak within the water heater 10 based on an electrical characteristic (for example, voltage or current) indicative of the load of the blower 20. The controller 55 may receive information either directly from the blower 20 or by analyzing the power supplied to the blower 20 (either directly or via a voltage/current sensor). FIG. 6 is a flowchart illustrating a process, or method, 600 of determining a leak in the water heater 10 using an electrical characteristic of the blower 20 according to another embodiment of the application. Again, while a particular order of processing steps, message receptions, and/or message transmissions is indicated in FIG. 6 as an example, timing and ordering of such steps, receptions, and transmissions may vary where appropriate without negating the purpose and advantages of the examples set forth in detail throughout the remainder of this disclosure. As an example, the method 600 is described as being performed by the controller 55, in particular, in terms of the electronic processor 205. However, it should be understood that in some embodiments, portions of the method 600 are performed external to the controller 55 by other devices.

Figure 7:
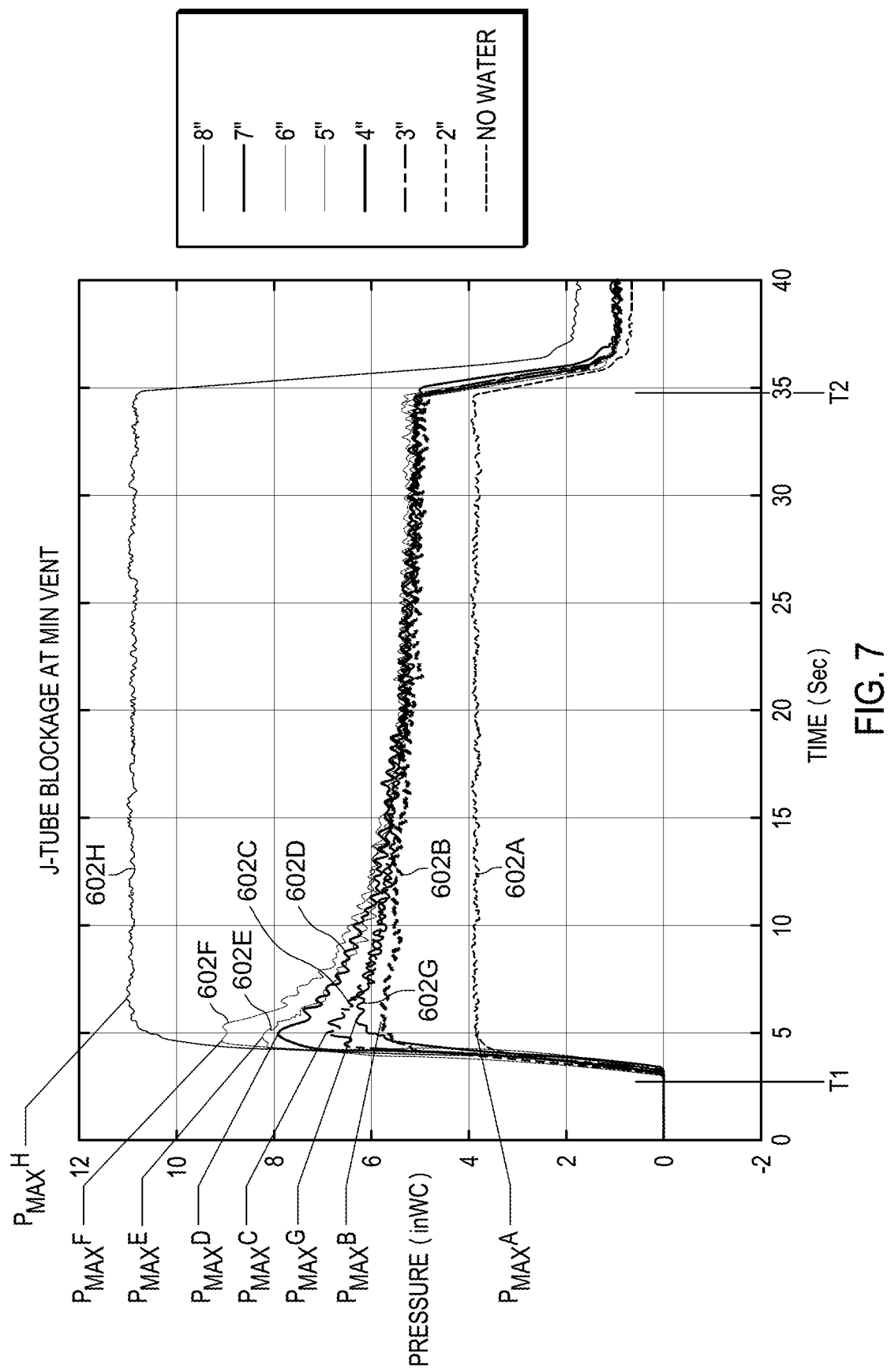
FIG. 7 is a chart illustrating the pressure over time of various amounts of condensate in a J-tube of the water heater of FIG. 1 during a purge cycle according to some embodiments.

At block 605, the controller 55 activates the blower 20 for a predetermined amount of time (for example, during the purge cycle) and, while the blower is active, the controller 55 determines an electrical characteristic measurement (for example, a measurement of the electrical load of the blower 20) over the predetermined amount of time (block 610). The electrical characteristic may be measured by the controller 55 via a voltage and/or current sensor (not shown) included within or external to the blower 20 and/or controller 55. At block 615, the controller 55 compares the minimum electrical characteristic measurement measured within a first predetermined time (for example, within the 2 to 3 seconds after activating the blower 20) to one or more characteristic thresholds. The characteristic threshold corresponds to a load that the blower 20 would experience when there is a particular amount or more of condensate within the J-tube 105. In some embodiments, each characteristic threshold may correspond to different amounts of trapped condensate and be used to estimate the amount of condensate blockage. For example, returning to FIG. 7, each maximum pressure measurement $P_{maxA}$-$P_{maxH}$ corresponds to a particular electrical load the blower 20 experiences for each amount of condensate. Accordingly, the controller 55 may estimate the particular amount of condensate within the J-tube 105A and/or 105B based on the electrical load of the blower 20. Returning to FIG. 6, at block 620, when the minimum electrical characteristic measurement is within a predetermined range of at least one of the characteristic thresholds, the controller 55 outputs a notification, via the input/output interface 215, that there is a (possible) leak within the water heater 10. The amount of load on the blower may be determined based on the voltage load of the blower within a first few seconds of starting the purge cycle. In some embodiments, a minimum value of the voltage load of the blower 10 is compared to one or more of a predetermined threshold.

The methods 400, 500, and 600 described above may be performed automatically by the controller 55 of the water heater 10 and started and/or repeated depending on the age of the water heater. In some embodiments, the method 400 may also be applied to different configurations of water heaters, such when the secondary heat exchanger 35 is configured as a coil. In such embodiments, the method 400 may be applied to determine a leak in the coil of the water heater 10 for example, by placing the particular sensor within the coil.

In some embodiments, the method 400 is performed following each wait cycle. After performing the method 400, in some embodiments, the controller 55 is configured to adjust either or both the wait time and the purge time (described above) based on whether or not a blockage was detected. The controller 55 may also adjust the amount of time between purge cycles of the water heater 10 based on whether or not a blockage was detected. For example, when a blockage is detected, the controller 55 may decrease the time between purge cycles so that the purge cycle is performed more often within a period of time. This may be done to prevent additional blockage (for example, condensate) in the J-tube 105 from building up to an amount that would take even more purge cycles and/or a greater speed of the blower 20 to purge. For example, when the blockage is the result of a steady flowing leak, there will be a more rapid increase in condensate in the J-tube 105 compared to when the leak is periodic dripping leak. As mentioned above, the controller 55 may adjust the purge time based on whether or not a blockage was detected. When a blockage is not detected, the purge time may be decreased (or kept the same depending on the amount of time) to a time suitable for purging condensate not resulting from a leak (for example, two minutes).

When a blockage is detected, the purge time may be increased (and/or time between purge cycles) in order to effectively purge the condensate within the J-tube. The increased purge time and/or number of purge cycles may depend on the speed of the blower and, in some embodiments, other factors. Such factors may include the estimated amount of condensate determined based on the measured characteristic of the blower 20 (described above). When a leak is determined for a number of purge cycles in a row, this may indicate that the purge time is not a sufficient amount of time to purge the condensate. Accordingly, the purge time (and/or time between purge cycles) may be increased after consecutively determining that there is a leak for a predefined number of purge cycles. For example, after determining that there is a leak three purge cycles in a row (i.e. three consecutive times the method 500 is performed), the purge time may be increased, for example, to thirty minutes.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A gas water heater comprising:
a blower; and
an electronic processor configured to
activate the blower for a predetermined amount of time between a first heating cycle and a second heating cycle of the gas water heater,
receive, during the predetermined amount of time, a measurement of a characteristic of the blower,
perform a comparison between the measurement and a predetermined characteristic threshold,
determine, based on the comparison, that a blockage is present within the water heater, and
output a notification in response to determining the blockage is present
wherein
the measurement is a minimum electrical characteristic measurement of the blower measured during the predetermined amount of time,
the predetermined characteristic threshold is a minimum electrical characteristic threshold, and
wherein the electronic processor is further configured to output the notification when the minimum electrical characteristic measurement fails to exceed the characteristic threshold.

2. The gas water heater of claim 1, wherein the predetermined characteristic threshold corresponds to an electrical load that the blower would experience when there is a particular amount or more of condensate within a tube coupled to the blower.

3. The gas water heater of claim 1, wherein the predetermined characteristic threshold corresponds to a particular amount of condensate.

4. The gas water heater of claim 1, wherein the blockage is indicative of a leak within the water heater.

5. A gas water heater comprising:
a blower; and
an electronic processor configured to
activate the blower for a predetermined amount of time between a first heating cycle and a second heating cycle of the gas water heater,
receive, during the predetermined amount of time, a measurement of a characteristic of the blower,
perform a comparison between the measurement and a predetermined characteristic threshold,
determine, based on the comparison, that a blockage is present within the water heater, and
output a notification in response to determining the blockage is present,
wherein the electronic processor is further configured to
determine, based on the measurement, an approximate amount of blockage; and
adjust a period between purge cycles of the water heater based on the approximate amount of blockage.

6. The gas water heater of claim 5, wherein the measurement is an air pressure measurement from a pressure sensor configured to measure an air pressure proximate to the blower and the predetermined characteristic threshold is a maximum pressure threshold.

7. The gas water heater of claim 6, wherein the electronic processor is further configured to receive, from the pressure sensor, a series of pressure measurements of an airflow within the blower over the predetermined amount of time, and wherein the comparison further includes analyzing, when the measurement exceeds the predetermined characteristic threshold, a plurality of pressure measurements over at least a portion of the predetermined amount of time to determine whether the measured pressure over time is approximately constant, and wherein the electronic processor is further configured to output the notification when the measured pressure over time is determined to be approximately constant.

8. The gas water heater of claim 5, wherein the predetermined characteristic threshold corresponds to an electrical load that the blower would experience when there is a particular amount or more of condensate within a tube coupled to the blower.

9. The gas water heater of claim 5, wherein the predetermined characteristic threshold corresponds to a particular amount of condensate.

10. The gas water heater of claim 5, wherein the blockage is indicative of a leak within the water heater.

11. A method of determining a leak within a water heater based on a characteristic of a blower of the water heater, the method comprising:
activating the blower for a predetermined amount of time between a first heating cycle and a second heating cycle of the water heater,
receiving, during the predetermined amount of time, a measurement of a characteristic of the blower,
performing a comparison between the measurement and a predetermined characteristic threshold,
determining, based on the comparison, that a blockage is present within the water heater, and
outputting a notification in response to determining the blockage is present,
wherein the measurement is a minimum electrical characteristic measurement of the blower measured during the predetermined amount of time,
the predetermined characteristic threshold is a minimum electrical characteristic threshold, and wherein the method further comprises outputting the notification when the minimum electrical characteristic measurement fails to exceed the characteristic threshold.

12. The method of claim 11, wherein the predetermined characteristic threshold corresponds to an electrical load that the blower would experience when there is a particular amount or more of condensate within a tube coupled to the blower.

13. The method of claim 11, wherein the predetermined characteristic threshold corresponds to a particular amount of condensate.

14. The method of claim 11, wherein the blockage is a result of a leak within the water heater.

15. A method of determining a leak within a water heater based on a characteristic of a blower of the water heater, the method comprising:
activating the blower for a predetermined amount of time between a first heating cycle and a second heating cycle of the water heater,
receiving, during the predetermined amount of time, a measurement of a characteristic of the blower,
performing a comparison between the measurement and a predetermined characteristic threshold,
determining, based on the comparison, that a blockage is present within the water heater, outputting a notification in response to determining the blockage is present, determining, based on the measurement, an approximate amount of blockage, and adjusting a period between purge cycles of the water heater based on the approximate amount of blockage.

16. The method of claim 15, wherein the measurement is an air pressure measurement from a pressure sensor configured to measure an air pressure proximate to the blower and the predetermined characteristic threshold is a maximum pressure threshold.

17. The method of claim 16, the method further comprising receiving, from the pressure sensor, a series of pressure measurements of an airflow within the blower over the predetermined amount of time, analyzing, when the measurement exceeds the predetermined characteristic threshold, a plurality of pressure measurements over at least a portion of the predetermined amount of time to determine whether the measured pressure over time is approximately constant, and outputting the notification when the measured pressure over time is determined to be approximately constant.

18. The method of claim 15, wherein the predetermined characteristic threshold corresponds to an electrical load that the blower would experience when there is a particular amount or more of condensate within a tube coupled to the blower.

19. The method of claim 15, wherein the predetermined characteristic threshold corresponds to a particular amount of condensate.

20. The method of claim 15, wherein the blockage is a result of a leak within the water heater.

* * * * *